R. G. DETWILER.
AUTOMATIC POULTRY FEEDER.
APPLICATION FILED JAN. 16, 1911.
1,034,087.
Patented July 30, 1912.
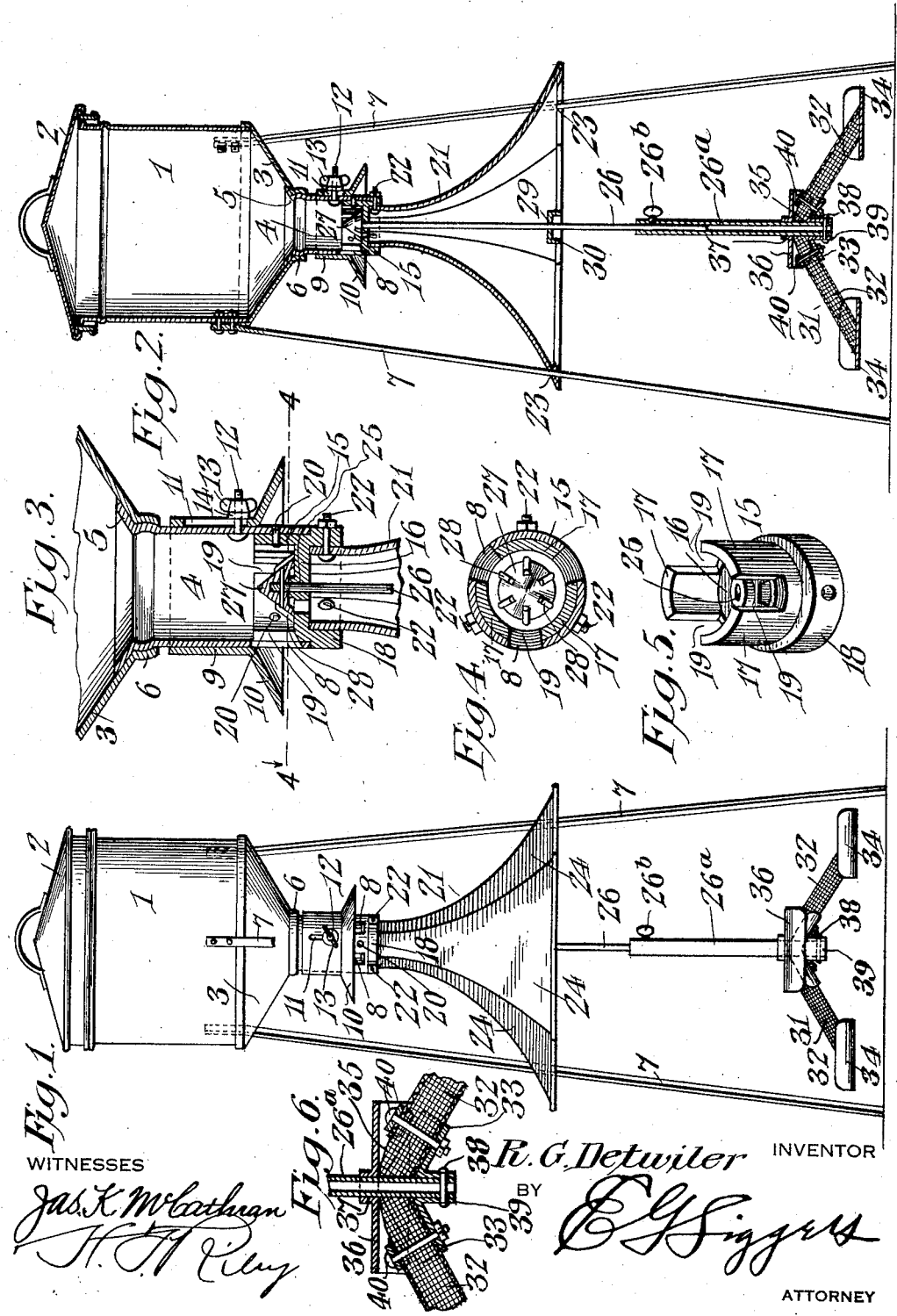
WITNESSES
INVENTOR
R. G. Detwiler
BY
ATTORNEY

UNITED STATES PATENT OFFICE.

REUBEN G. DETWILER, OF TELFORD, PENNSYLVANIA, ASSIGNOR TO HARRY L. DETWILER, OF TELFORD, PENNSYLVANIA.

AUTOMATIC POULTRY-FEEDER.

1,034,087. Specification of Letters Patent. Patented July 30, 1912.

Application filed January 16, 1911. Serial No. 602,973.

*To all whom it may concern:*

Be it known that I, REUBEN G. DETWILER, a citizen of the United States, residing at Telford, in the county of Bucks and State of Pennsylvania, have invented a new and useful Automatic Poultry-Feeder, of which the following is a specification.

The invention relates to an automatic poultry feeder and exerciser.

The object of the present invention is to improve the construction of poultry feeders, and to provide a simple, inexpensive and efficient device capable of easy operation, and adapted to scatter the feed over a comparatively large area.

A further object of the invention is to provide a poultry feeder of this character, equipped with a bait holder, arranged to feed young chickens and adapted to educate fowls into operating the apparatus.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of an automatic poultry feeder, constructed in accordance with this invention. Fig. 2 is a central vertical sectional view. Fig. 3 is an enlarged detail sectional view, illustrating the construction of the feed controlling mechanism. Fig. 4 is a horizontal sectional view on the line 4—4 of Fig. 3. Fig. 5 is a detail perspective view of the bearing member for supporting the upper end of the central rod or shaft. Fig. 6 is an enlarged detail view of the central portion of the combined bait holder and feeder.

Like numerals of reference designate corresponding parts in all the figures of the drawing.

In the accompanying drawing illustrating the preferred embodiment of the invention, 1 designates a feed hopper of cylindrical form, designed to be constructed of galvanized sheet metal, or other suitable material and provided at the top with a cover 2, and having a tapered lower portion 3 from which depends a cylindrical neck 4. The neck 4, which is suitably secured at its top to the tapered bottom portion of the hopper, is preferably provided at the top with an inclined or flaring annular flange 5, which is arranged within and fitted against the tapered portion of the bottom of the hopper. The bottom of the hopper is provided with a depending annular flange 6, which is secured to the contiguous portion of the depending neck. The upper end of the neck may, however, be connected to the hopper in any other suitable manner. The hopper is supported by legs 7, constructed of suitable metal and secured by bolts, or other suitable fastening devices to the sides of the hopper.

The depending cylindrical neck 4 is provided at its lower portion with a series of openings 8, forming lateral feed outlets, the size of the outlets being controlled by a cut-off 9, consisting of a sliding sleeve, provided at its lower end with an inclined annular flange 10, extending downwardly and outwardly and forming a shield to protect the feed within the neck from the weather, and to prevent sparrows from obtaining feed from the neck. The sliding cut-off, which is movable upwardly and downwardly, is provided with a vertical slot 11, and it is secured in its adjustment by a clamping bolt 12, piercing the neck and operating in the slot 11 and provided with a thumb nut 13, a washer 14 being preferably interposed between the thumb nut and the cut-off. Any other suitable means, however, may be employed for securing the cut-off in its adjustment.

To the lower end of the neck is secured a circular bearing member 15, consisting of a horizontal spider 16, an upwardly extending annular flange 17 and a lower depending annular flange 18. The upwardly extending annular flange fits within the lower end of the neck 4, and it is provided with openings 19 registering with the outlet openings 8 of the neck. The upwardly extending flange 17 is fastened to the neck by rivets 20, or other suitable fastening devices, and the depending annular flange 18 receives the upper end of an approximately conical scattering device 21, secured to the flange 18 by bolts 22, or other suitable fastening devices and provided at its bottom with openings 23 through which the legs 7 pass. The approximately conical scattering device is composed of an annular series of tapering plates or sections 24, which are curved from top to bottom, presenting concave outer faces and forming an enlarged flaring bottom, whereby the scattering device is adapted to spread the feed over a comparatively large area and cause the fowls to exercise in order to obtain the same. This will prevent fowls from gorging themselves as they do when the feed is placed in receptacles upon the ground, or thrown upon the latter in large quantities.

The spider 16 of the bearing member 15 is provided with a central bearing opening 25 for the upper end of a central vertical rod 26, extending through the spider and carrying a feed cone 27, and telescoping into a lower vertical tube 26$^a$, which is adjustable on the central vertical rod 26, being secured in its adjustment by a clamping screw 26$^b$. The rod and the tube constitute upper and lower sections of an adjustable stem or shaft. The feed cone 27, which is arranged upon the spider, covers the openings thereof and presents inclined faces to the outlet openings of the neck, and it is provided at its lower portion with an annular series of spaced inclined ribs 28. The ribs extend upwardly from the base of the feed cone and terminate short of the apex, and are adapted to engage the grain or other feed within the depending neck of the hopper, so that the slightest rotary movement of the central stem or shaft will discharge a quantity of feed. The grain or other feed discharged from the hopper falls upon the curved inclined sides of the deflector and is scattered in all directions.

The rod 26 extends downward through a central bearing 29 of a cross bar 30, and the lower tubular section of the central shaft or stem carries a combined bait holder and feeding device 31 at its lower end. The cross bar 30, which is preferably constructed of flanged metal, is secured at its ends to and is carried by the scattering device 21. The combined bait holder and feeding device comprises a pair of inclined tubular arms 32, constructed of wire gauze or other foraminous material, and secured at their upper ends to a support 33 and carrying short troughs 34 at their lower ends. The short troughs 34, which have a bottom and sides, are adapted to receive part of the feed falling from the tubular arms. These tubular arms, which form receptacles for the feed or bait, are provided at the top with an opening 35, which is covered by a semi-cylindrical hood 36, having a central opening 37 for the passage of the lower section or tube 26$^a$, and extending in opposite directions from the same. The hood 36, which forms a cover for the opening of the tubular arms 32, is loosely arranged on the tubular lower section 26$^a$ and is adapted to be readily raised to afford access to the interior of the arms 32. The support 33, which is approximately V-shaped, is composed of angularly related sides, curved transversely to conform to the configuration of the tubular arms 32, and it is provided with a central opening to receive the lower tubular section 26$^a$, and is secured to the same by a rivet 38, or other suitable fastening device, which passes through an annular boss 39, but the combined bait holder and feeding device may be secured to the lower adjustable section of the shaft or stem in any other desired manner. By this construction the combined bait holder and feeding device is adjustably mounted, and is adapted to be raised or lowered to arrange it at the proper elevation. The troughs 34 are approximately semicylindrical and are secured to and extend outwardly from the lower ends of the tubular arms, which fit within the troughs. The bait holder and feeder is adapted for feeding young chickens, and it also serves to educate fowls to operate the feeder. The fowls pecking at the feed within the tubular arms will move the same and partially rotate the feeding mechanism, which will scatter a quantity of feed over the surface upon which the automatic feeder is placed, and after this has been consumed by the fowls, the latter will return to the bait holder and repeat the operation. The angularly related inclined arms of the combined bait holder and feeding device enable chickens to pass beneath the same, and they are in a position to be easily operated on by the fowls. The upper end of the angularly related arms or receptacles are secured to the support 33 by bolts 40, or other suitable fastening means.

Having thus fully described my invention, what I claim as new and desire to secure by Letters Patent, is:—

1. An apparatus of the class described including a hopper provided with a depending neck having a lateral outlet, a cut-off consisting of a sleeve surrounding the neck and slidable upwardly and downwardly on the same to vary the size of the outlet, said sleeve being provided at the lower edge with an inclined flange extending around the neck and carried by the sleeve in the adjustment thereof and projecting downwardly and outwardly over the outlet from the top thereof, and means for securing the cut-off in its adjustment.

2. An apparatus of the class described including a hopper having a depending neck provided with outlets, a bearing member provided with upwardly and downwardly extending flanges, the upwardly extending flange being secured within the neck and having openings corresponding with the said outlets, a central stem journaled in the bearing member, a feed ejecting device secured to the upper end of the stem and rotating within the upper flange, and a scattering device tapered upwardly and secured to the downwardly extending flange of the bearing member.

3. An apparatus of the class described including a hopper having an outlet, rotary means for forcing the feed through the outlet, a stem connected with the rotary means, and a combined bait holder and feeder supported by the stem and composed of inclined tubular arms having an inlet opening at the top, and a hood slidable on the stem and forming a cover for the said opening.

4. An apparatus of the class described including a hopper having an outlet, rotary means for forcing the feed through the outlet, a stem connected with the rotary means, and a combined bait holder and feeder supported by the stem and composed of inclined tubular arms having an inlet opening at the top, horizontal troughs carried by the outer ends of the arms, and a cover mounted on the stem and arranged over the opening.

5. An apparatus of the class described including a hopper having an outlet, rotary means for forcing the feed through the outlet, a stem connected with the rotary means, and a combined bait holder and feeder supported by the stem and composed of a support adjustably secured to the stem and provided with inclined sides, inclined tubular arms secured to the said inclined sides, and having an inlet opening and a cover mounted on the stem and arranged over the inlet opening.

6. An apparatus of the class described including a hopper having an outlet, rotary means for forcing the feed through the outlet, a stem connected with the rotary means, and a combined bait holder and feeder supported by the stem and composed of tubular arms extending in opposite directions from the stem and having an inlet opening at their inner ends, and an approximately semi-cylindrical cover slidable on the stem and arranged over the opening.

In testimony, that I claim the foregoing as my own, I have hereto affixed my signature in the presence of two witnesses.

REUBEN G. DETWILER.

Witnesses:
LILIAN GRATER,
IRWIN T. EHST.

---

Copies of this patent may be obtained for five cents each, by addressing the "Commissioner of Patents, Washington, D. C."